Dec. 17, 1929.　　　P. S. SHIELD　　　1,739,870
DISPENSING APPARATUS
Filed May 21, 1928　　　7 Sheets-Sheet 1

Dec. 17, 1929.  P. S. SHIELD  1,739,870
DISPENSING APPARATUS
Filed May 21, 1928  7 Sheets-Sheet 2

INVENTOR
Paul S. Shield
BY
his ATTORNEY

Dec. 17, 1929.  P. S. SHIELD  1,739,870
DISPENSING APPARATUS
Filed May 21, 1928  7 Sheets-Sheet 3

Dec. 17, 1929.  P. S. SHIELD  1,739,870
DISPENSING APPARATUS
Filed May 21, 1928   7 Sheets-Sheet 4

INVENTOR
Paul S. Shield
BY
ATTORNEY

Dec. 17, 1929.   P. S. SHIELD   1,739,870
DISPENSING APPARATUS
Filed May 21, 1928   7 Sheets-Sheet 6

INVENTOR
Paul S. Shield
BY
his ATTORNEY

Dec. 17, 1929.  P. S. SHIELD  1,739,870
DISPENSING APPARATUS
Filed May 21, 1928   7 Sheets-Sheet 7

INVENTOR
Paul S. Shield
BY
ATTORNEY

Patented Dec. 17, 1929

1,739,870

UNITED STATES PATENT OFFICE

PAUL S. SHIELD, OF CINCINNATI, OHIO, ASSIGNOR TO AUGUSTINE DAVIS, JR., OF CINCINNATI, OHIO

DISPENSING APPARATUS

Application filed May 21, 1928. Serial No. 279,489.

The invention relates to metering and dispensing apparatus and mechanism.

The principal object of the invention is to provide an improved predetermining and indicating mechanism for meters or measuring dispensers which is highly effective for its purposes and is adapted for manufacture at reasonable cost.

These and other objects and features of the invention will become apparent as the specification proceeds.

In the accompanying drawings forming part hereof:

Figure 1:
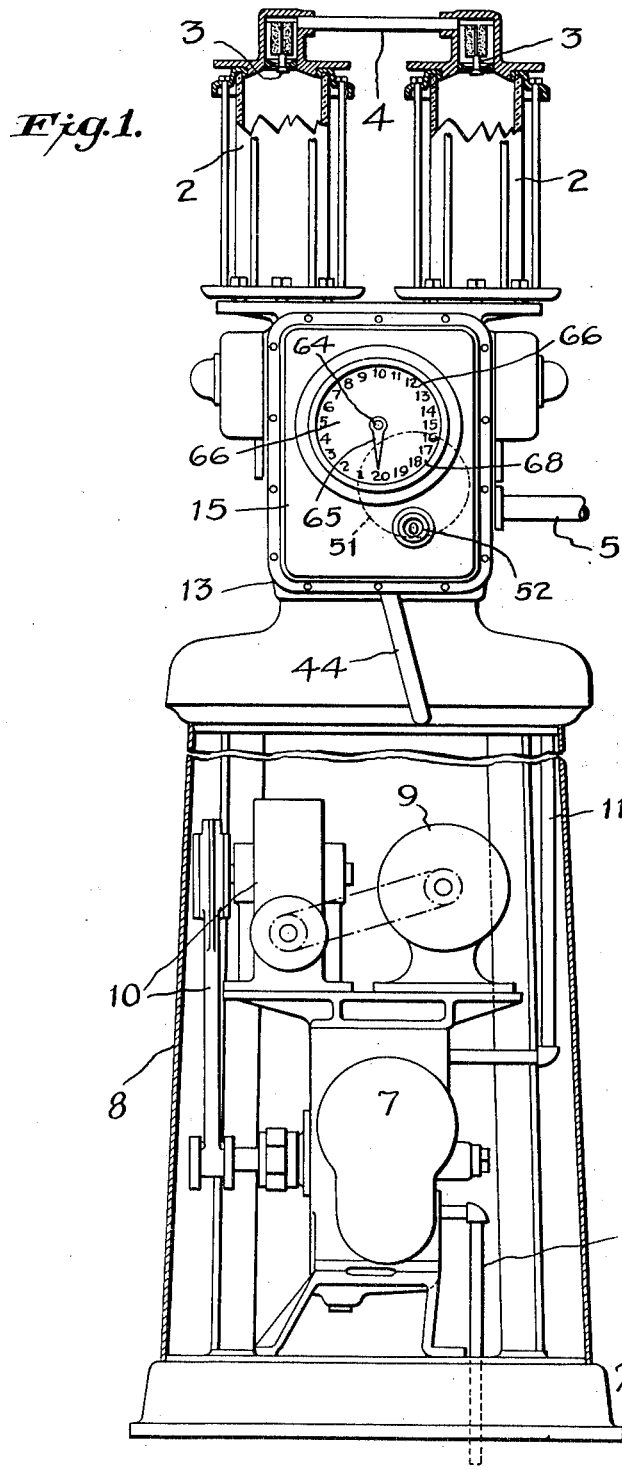
Fig. 1 is an elevation of a gasoline dispenser embodying the invention, with parts in section, and an intermediate portion in height of the dispenser broken out.
Figure 2:
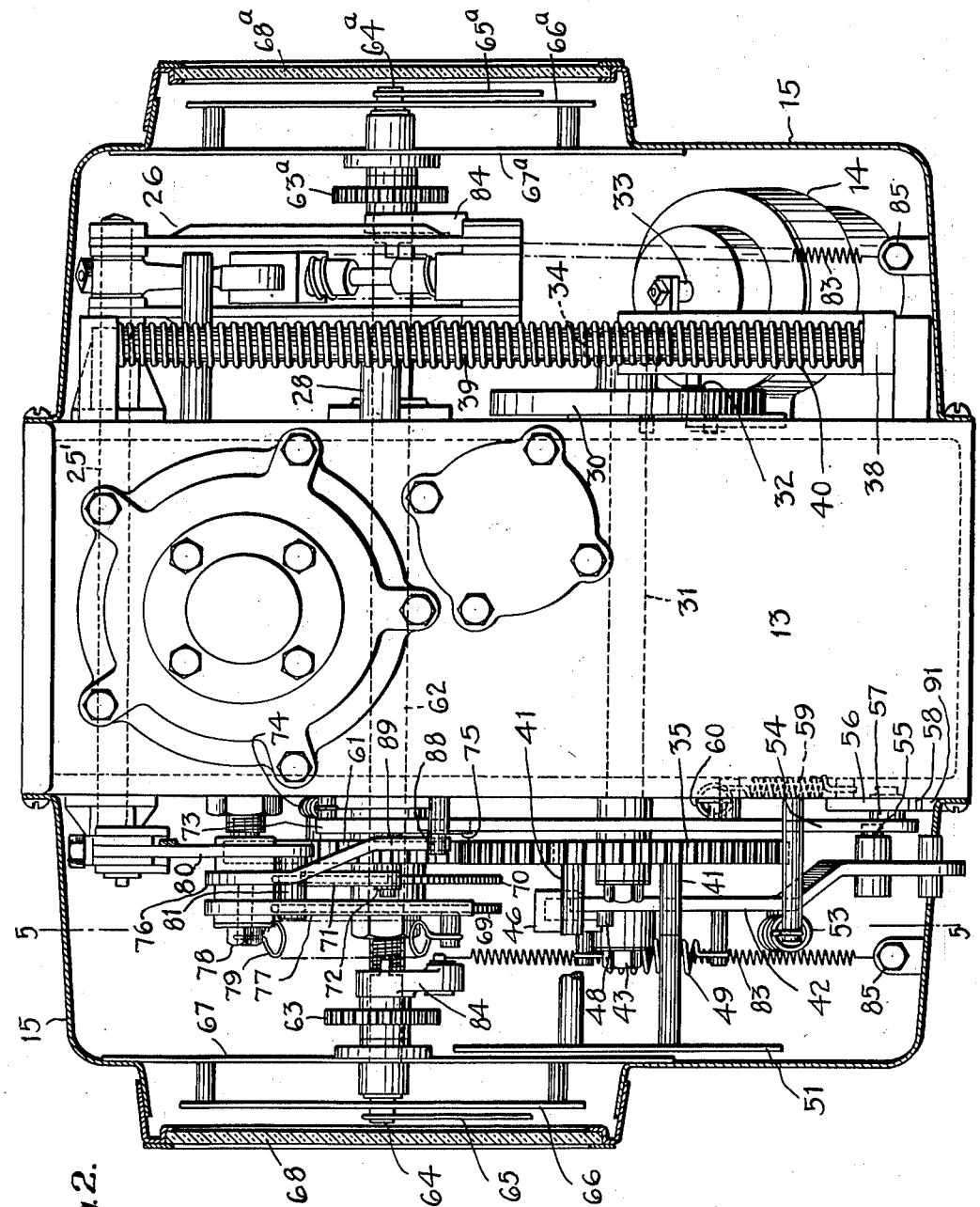
Fig. 2 is an elevation looking at right angles to Fig. 1 of a frame part carrying the predetermining and indicating mechanism and other parts, the cover plates being in section.

The meter illustrated in connection with the gasoline dispenser shown in the accompanying drawings is of the type having twin unit measuring vessels 2, 2, with means controlled by the fluid for switching the flow of liquid so that one chamber is being filled while the other is emptying and vice versa. Each vessel has a vent at the top commanded by a float valve 3, and the vents are interconnected at 4. The pressure developing on the liquid when a vessel is completely filled causes the operation of valve mechanism, which permits the contents of the filled chamber to flow out through a delivery passage 5, and admits liquid to the other chamber, this operation being repeated until a predetermined amount of liquid has been measured and delivered.

The present improvements are not necessarily limited to the precise type of meter, and, as the meter shown is not novel per se with this application, it will be described briefly, reference also being made at this time to other parts of the dispenser.

A conduit 6 extends from an underground tank to a pump 7 in the closed-in base 8 of the dispenser. This pump may be operated either by hand or by an electric motor 9 through suitable connections 10. The pump delivers the liquid to the measuring vessels, and when one of the vessels has been filled and its vent has been closed creates an operating pressure.

A conduit 11 extends from the outlet of the pump to an opening 12 in an upper frame member 13 beneath the vessels 2. This opening is the inlet to a master valve casing 14, which is detachably applied to one face of said frame member, beneath a hollow cover plate 15. There are two of these cover plates, removably secured to opposite sides of the frame member, housing various parts and mechanism.

The valve member 16 in the casing 14 constitutes a means for rendering the dispenser inoperative, that is to say, for preventing further operation of the dispenser, when a predetermined quantity of liquid has been passed.

Another opening 17 in said frame member is the outlet from the master valve, and a branched passage 18 formed in the interior of the frame member leads to remote ends of a piston valve cylinder or cylinders 19.

A four-way valve device 20 operating in these cylinders may consist of two piston valve portions connected by a rod 21, the valve portions occupying positions alternately at different sides of ports 22, which communicate with spaces 23, which in turn communicate with the vessels 2. In one position of the valve device communication is open from the supply passage 18 to the right-hand vessel and cuts off communication between this vessel and the discharge passage 5; at the same time communication between the supply passage and the left-hand vessel is cut off, and that vessel is open to the discharge. In the other position of the four-way reversing valve these conditions are reversed.

When one of the vessels has been filled, the pressure developing therein acts on one end of an operating piston 24 which works in a cylinder 25, the opposite ends of which are open to the spaces 23. This piston is consequently moved, and movement is communicated by an arm 24' to a rock-shaft 25'. A snap-over device 26 is operatively connected with this rock-shaft and with an arm 27 on another rock-shaft 28, this rock-shaft being connected by an arm 29 with the reversing valve 20. Such snap-over actions are known and need not be particularly described. Suffice it to say that by suitable means the pressure on the liquid is utilized to cause the reversal of the four-way valve or valves, to the end that as long as liquid is supplied to the meter under pressure, the meter operates and delivers the measured quantities.

The novel predetermining and indicating mechanism will now be described. The function of the predeterminer is to be set for any desired quantity and to cause the master element, or valve, to come into action when that quantity has been passed so as to stop the operation of the dispenser. The indicator is one which advances during the operation of measuring and delivering so as to show the customer the amount that he receives. At the conclusion of the delivery the indicator shows the amount that has been delivered. The predeterminer is capable of being set by movement relative to the indicator, which remains in normal position after the predeterminer has been set. The predeterminer is also capable of being set for an additional delivery, without disturbing the reading of the indicator, the measuring of the additional amount causing the indicator to progress so that at the conclusion of the transaction it shows the total quantity sold.

Means are provided for restoring the indicator and the predeterminer to their normal positions or conditions, when a transaction has been completed. These matters are not new broadly, but are accomplished in a novel and advantageous manner in the mechanism which will be described. While the particular form of this mechanism is deemed desirable, it will be understood that there may be various changes without departing from the generally novel plan.

The terms predeterminer and indicator are used in a sense to include the parts that are related to the predeterminer and indicator proper.

The predeterminer proper is preferably a disc 30 fixed to a rotatable shaft 31. Such predeterminer discs are known: The periphery of the disc contains a notch 31' in which a roller 32 connected to the stem 33 of the predeterminer valve member 16 normally rests. In that condition the predeterminer valve is closed by its spring, making it impossible for liquid to be supplied to the meter. The predeterminer can be moved in only one direction from its normal, or non-delivery, position, and when it is moved in that direction the roller 32 is cammed out of the notch and onto the circular periphery of the disc, holding the master valve open. During the course of a delivery then made the predeterminer is turned backward in accordance with the progress of the delivery, until the roller again drops into the notch, stopping the operation.

The shaft 31 passes through the frame member 13, and carries the disc 30 and a pinion 34 at one side thereof. At the opposite side it carries a gear wheel 35.

The pinion 34 meshes a rack 35' on a slide 36, which is guided on a rod 37. The slide 36 has a toe 38 which is guided on another rod 39, and is pressed against by one end of a helical spring 40 about said second rod. This spring is under some initial compression, and when the predeterminer is turned in the setting direction the slide 36 is moved so as to increase the compression. Power is thus stored up, and this power is applied to drive the predeterminer and indicator mechanism during the operation of the meter, the meter itself not being required to perform this duty but only to operate an escapement.

The provision of a long helical spring for the purpose indicated is especially advantageous.

The gear 35 has four equidistant pins 41 projecting from its outer face. The capacity of the predeterminer may be assumed to be twenty gallons (or other units), and the angular distances between the four pins may therefore be understood as representing five gallons each. Naturally the predeterminer may be of other capacity, and the projections may be of other number.

The predeterminer is set by means of a lever 42 which is fulcrumed on a stud 43. This lever may be adapted to have a removable handle 44 applied to it. The lever has an angular arm 45, to which a finger 46 is pivoted at 47, this finger being supported against relative pivotal movement in one direction by an abutment pin 48, against which it is held by a spring 49. When the lever is swung in a clockwise direction in Fig. 3, the finger 46 acts positively against one of the projections 41, so as to turn the predeterminer. If the lever is moved all the way to a stop 50, the predeterminer is turned a five-gallon distance, in this particular instance.

Customers more ordinarily call for five gallons or a multiple of that quantity, and it is a decided convenience for the attendant to be able to set the predeterminer for five, ten, fifteen or twenty gallons by one, two, three or four full strokes of the operating handle without other attention. If an amount other than five gallons or a multiple thereof is ordered, the attendant watches an attendant's indicator, and is also guided by the sound or feel of a ratchet which will be described.

The attendant's indicator is not to be confused with the customer's indicator, which is referred to simply as "the indicator". The attendant's indicator may comprise a disc 51 carried from the gear wheel 35 by the pins 41, this disc bearing numerals which show one at a time through a window 52 in one of the cover plates 15.

On each return or idle stroke of the lever 42, which is accomplished by a spring 53, the finger 46 latches past that one of the projections 41 which it encounters.

The spring 53 holds the setting lever 42 against a clearing lever or member 54. This member is advantageously pivoted on the predeterminer shaft 31. The setting lever has a pin 55 which normally bears against the edge of the clearing member, and the clearing member is acted upon by a spring 60 of stronger effect than the spring 53, the effect of the spring 60 being to hold the clearing member against a fixed abutment 54ª.

The spring 60 acts on the clearing lever 54 in a direction contrary to the action of the spring 53, the effect of the spring 60 being stronger than that of the spring 53.

The clearing member has a full-stroke finger 56 pivoted to it at 57 and acted upon by a spring 59, this full-stroke finger being arranged to cooperate with a projection 58 on the fixed frame. The purpose of this full-stroke mechanism is to prevent the attendant from clearing the customer's indicator by a quick movement of the lever 44 to the right and then immediately moving it back to the left so as to catch the indicator before it returns all the way to zero.

The clearing function of the clearing lever will be explained hereinafter.

The gear 35 meshes another gear 61, which is loose on a shaft 62, which may be termed the indicator shaft. This shaft also passes through the frame member 13. At its opposite ends it is geared by gearings 63, 63ª to the arbors 64, 64ª of indicator hands 65, 65ª, which operate over dials 66, 66ª carried by frame pieces 67, 67ª secured in the two covers 15. These dials and hands are visible through glasses 68, 68ª. A double indicator is thus provided, visible at opposite sides of the dispenser.

Fixed to the shaft 62 are a pair of ratchet wheels 69 and 70 having their teeth inclined in opposite directions. A single member might be made to serve the purpose, but it is convenient and cheap for manufacturing purposes to use duplicate ratchets and assemble reversely on the shaft.

A dog or pawl 71 pivoted at 72 on the wheel 61 coacts with the ratchet wheel 70, providing a simple form of one-way acting connection or overrunning clutch between the predeterminer and the indicator. In the particular construction shown the pawl is rigid with its pivot 72, which passes through and is capable of turning in an opening in the gear wheel. At the opposite side of said wheel the pivot shaft carries an arm 73, to which is connected a spring 74, the spring being fastened at its other end to the wheel so as to urge the nose of the pawl into engagement with its ratchet. This pawl also has a tail 75, for a purpose which will appear.

The ratchet wheel 69 is controlled by an escapement device comprising two dogs 76 and 77 which are pivoted on a pin 78 and connected by a spring 79 tending to draw them together. A lever 80 is also pivoted on the pin 78 and has a projection 81 which stands between the dogs 76 and 77 near their fulcrum, holding them apart and serving, on oscillation of the lever, to move the dogs alternately in opposite directions. When either escapement dog is thus moved the connecting spring draws the other to follow the pin 81.

The lever 80 is connected by a toggle 82 with the rock-shaft 25', to which reference has already been made. This shaft is rocked in time with the measuring of the liquid, and the escapement is thus operated by or with the operation of the meter.

In either extreme, flexed position of the toggle 82 the dog 76 is in holding relation to a tooth of the ratchet wheel 69. During a stroke of the toggle in either direction, the dog 76 is withdrawn from engagement with the escapement wheel and the dog 77 is momentarily brought into a space between two teeth, allowing the escapement wheel to move the distance of half a tooth; then when the toggle passes dead center, the dog 76 is brought back into engagement with the wheel while the dog 77 is moved out, thereby permitting the escapement wheel to proceed another half-tooth distance. The indicator and the predeterminer are thus moved one step by the driving spring 39 for each movement of the shaft 25, representing the measuring and delivery of one gallon or other unit of liquid.

Advantageous means are provided for restoring the indicator to normal or initial position after a delivery has been made. The indicator referred to is the customer's indicator having the hands 65, 65ᵃ at opposite sides of the dispenser. A spring is preferably used for the purpose, but not a spiral spring which is wound up with the progress of the indicator during delivery. Instead a helical spring 83 is employed the tension or stress in which is increased as the indicator moves through 180° and is then diminished. The spring is connected at one end to an arm 84 fixed on the arbor 64 and at the other end to an anchorage 85 on the fixed frame. Such a spring will restore the indicator to normal by movement in either a clockwise or a counter-clockwise direction, depending on the distance through which the indicator has been moved.

If the delivery were to stop at ten gallons, say, with the spring on dead center, it might be prevented from acting. For that reason I provide a connection between the spring and the indicator which automatically shifts, under the action of the spring, past the dead center position. This may be accomplished in a simple manner by connecting the end of the spring to a pin 86 which can move freely in an inclined slot 87 in the arm 84.

One of the springs 83 could suffice, but two of them are preferably employed, similarly connected with the two parts of the indicator at opposite sides of the frame.

Figure 3:
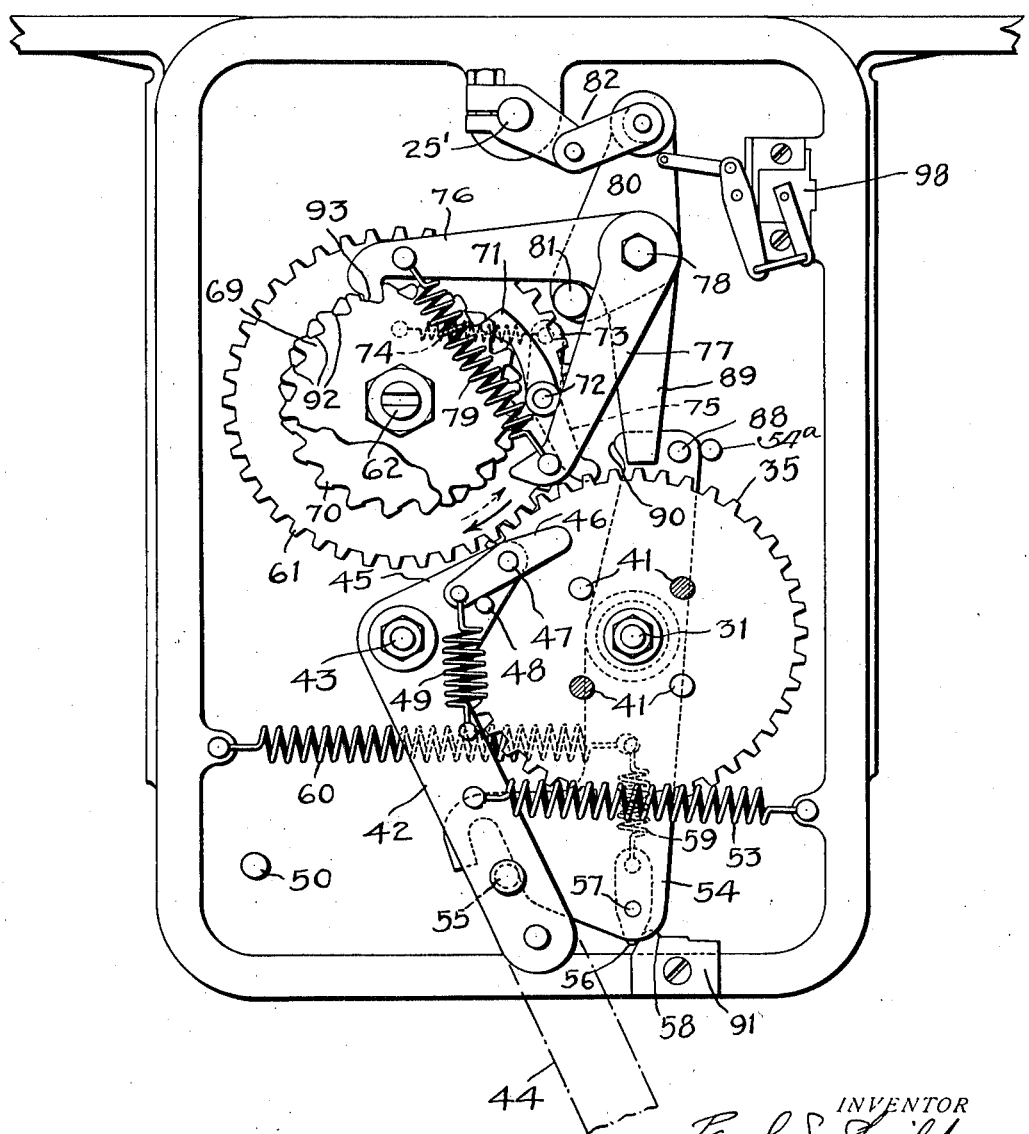
Fig. 3 is an elevation looking at the left-hand side of Fig. 2, with the cover plate and parts connected therewith removed.
Figure 4:
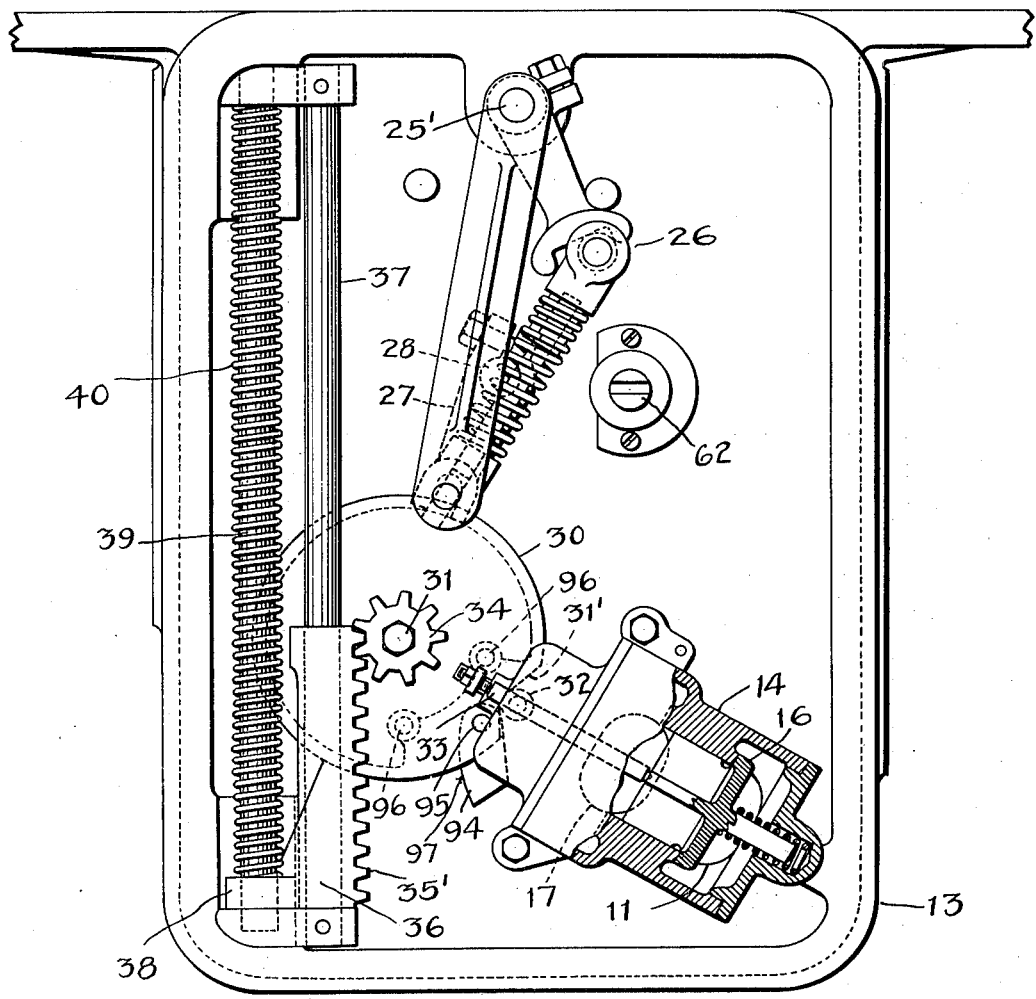
Fig. 4 is a similar view looking at the opposite side.
Figure 5:
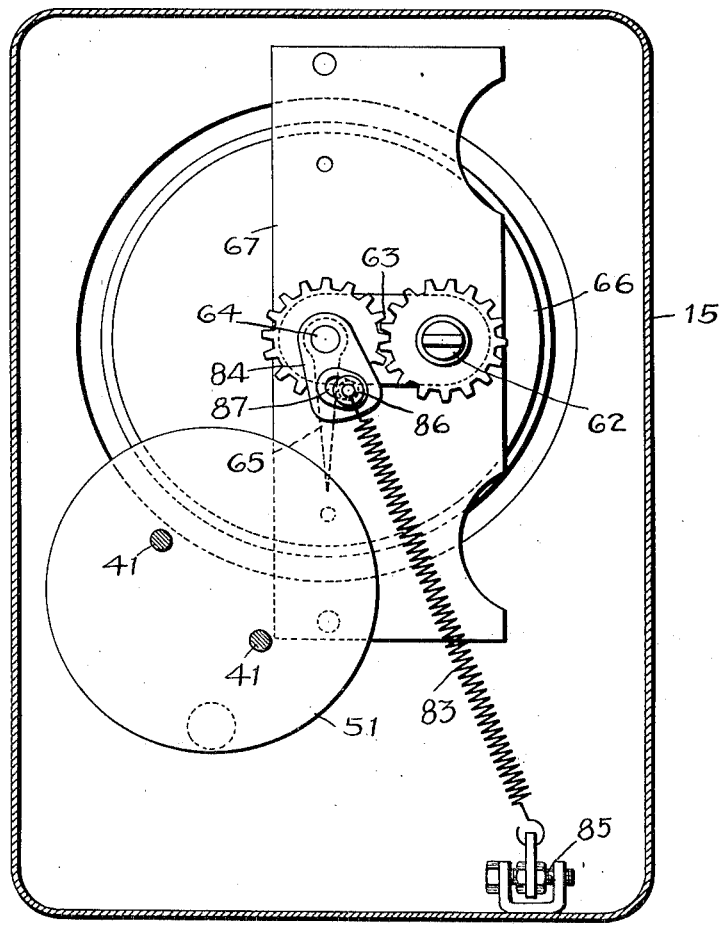
Fig. 5 is a section on the line 5—5 of Fig. 2.
Figure 6:
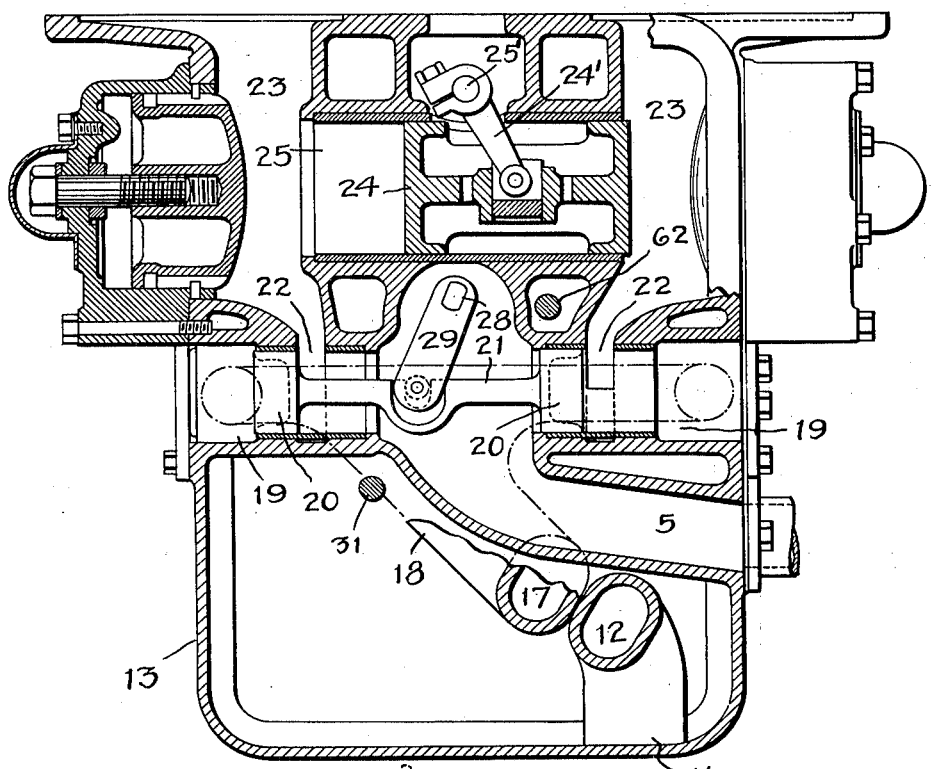
Fig. 6 is substantially a vertical section through the frame casting shown in Figs. 2–5, with the parts in the interior thereof partly in section and partly in elevation.

The clearing lever 54 has a pin 88 which is adapted to contact with a tail 89 on the escapement dog 76, when the clearing lever is moved in a counter-clockwise direction in Fig. 3, to release this dog from the escapement wheel 69. At the same time, the nose 90 of the clearing lever contacts with the tail 75 of the pawl 71, so as to disengage this pawl from the ratchet wheel 70.

Both the indicator and the predeterminer are then free to be restored to normal position, the former under the action of the spring 83 and the latter under the action of the spring 39.

This clearing operation is accomplished by movement of the setting lever 42 in a counter-clockwise direction in Fig. 3. By this movement the clearing lever 54 is forced so that the non-positive stop or latch finger 56 rides over the projection 58. This projection 58 forms part of a plate 91, which together with the pivoted finger 56 constitutes a full stroke device, making it impossible for the operator to make a quick short to and fro movement of the lever 42, for the purpose of catching the indicator before it returns all the way to initial position, which if it were possible would enable him to defraud a subsequent customer.

The operation will be briefly summarized. The predeterminer disc 30 is set by means of the lever 42 in the manner which has been described, causing the master valve to be opened. In the setting operation the predeterminer disc and the gears 35 and 61 are moved in the direction of the full line arrows, but the indicator is not moved. That is to say, the ratchet wheels 69 and 70, the shaft 62, the arbors 64, 64ᵃ and the hands 65, 65ᵃ remain stationary, the pawl 71 clicking idly over the ratchet wheel 70.

Let us say that the attendant has set the predeterminer for five gallons. He then sets the pump 7 in operation, forcing liquid up to the meter. The meter is operated by the pressure of the liquid in the manner that has been explained, rocking the shaft 25. This operates the escapement 80, 76, 77, etc., permitting the predeterminer and indicator to move step by step, as indicated by the light arrows, under the power which was stored up in the spring 39 in the setting operation.

When the notch in the predeterminer disc comes opposite the roller 32, the roller drops into it, and the master valve closes, terminating the delivery.

The indicator hands 65 then show the amount that has been delivered.

In order to restore the indicator to normal condition, the attendant moves the lever 42 in the backward direction, actuating the clearing lever 54, which disengages both the escapement holding dog 76 and the clutch dog 71 from the ratchet wheels. The spring or springs 83 then restore the indicator to normal by clockwise or counter-clockwise movement, indifferently.

Frequently the delivery must be stopped short of the amount for which the predeterminer was set. Thus if it appears that the customer's tank is becoming too full, the attendant will stop the pump. When he then clears the mechanism in the manner which has been described, the release of the pawl 71 permits the spring 39 to restore the predeterminer to normal position.

The customer after receiving the amount of gasoline which he ordered may find that his tank is not sufficiently filled and ask for an additional number of gallons. In that event, the attendant does not clear the mechanism. The predeterminer has then been returned to its initial position, and the indicator stands at the amount delivered. The attendant sets the predeterminer for the additional quantity, this operation leaving the indicator undisturbed. When now the meter is operated and the additional delivery is made, the additional gallons are added on the indicator, so that the indicator shows the total amount delivered.

The mechanism is then cleared in the ordinary way.

Figure 7:
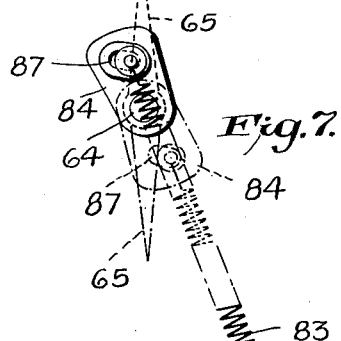
Fig. 7 is a detail of a part of the mechanism, showing different positions in full and dotted lines.

The spring or springs 83 tend part of the time to turn the ratchet wheel 69 in a clockwise direction in Fig. 7. It is desirable to make the teeth of this wheel with sloping faces on one side, which would ordinarily enable the dog 76 to hold this ratchet wheel and its connected indicator parts only as against rotation in a counter-clockwise direction. This would permit the indicator to slip backward relatively to the driving mechanism during the operation of making a delivery, so that the indicator would not give a true reading.

For this reason, the sloping faces of the teeth of the ratchet 69 are formed with low holding shoulders 92, and the nose of the dog 76 is formed with a cooperative shoulder 93.

The teeth of the ratchet 70 are shown formed in the same manner. This is not for any functional purpose in connection with the pawl 71, but because economy is served by making one form of ratchet wheel serve for both purposes.

If a customer ordered twenty gallons, which in this particular instance is the capacity of the predeterminer, the roller 32 of the master valve would simply drop into the notch 31 when the predeterminer disc 30 had been moved in setting through a complete revolution. This would cause the master valve to close again and there could be no delivery.

To overcome this difficulty a bridge piece 94 is pivoted at 95 to the predeterminer disc. This piece can swing loosely, but is confined within limits by pins 96 on the disc. The piece has an arcuate edge 97, which is adapted to bridge the notch 31 and to complete the circular periphery of the disc, in event that the disc in the setting operation is turned far enough to bring and fold the piece under the roller 32 and against a suitable abutment portion of the disc. The bridge piece then prevents the roller 32 entering the notch 31.

A counter 98 may be connected with the escapement operating lever 80.

Figure 9:
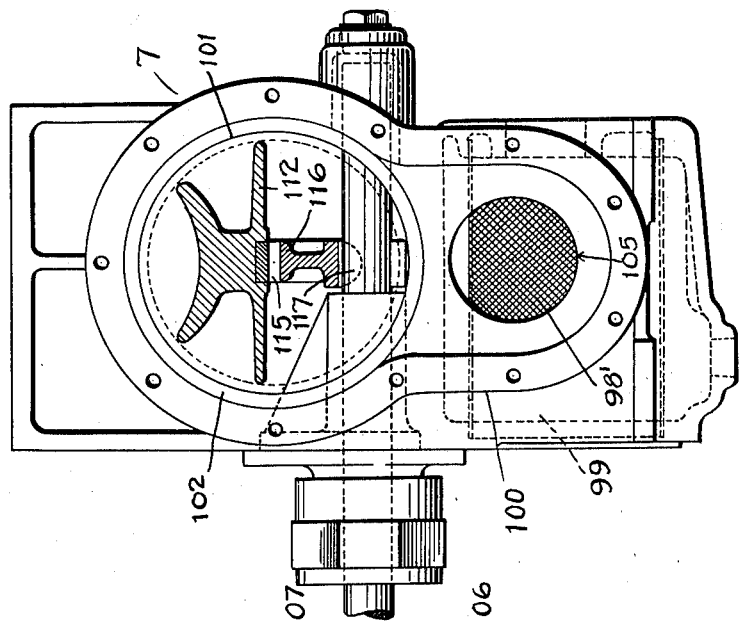
Fig. 9 is an end view of the same with the head removed.
Figure 8:
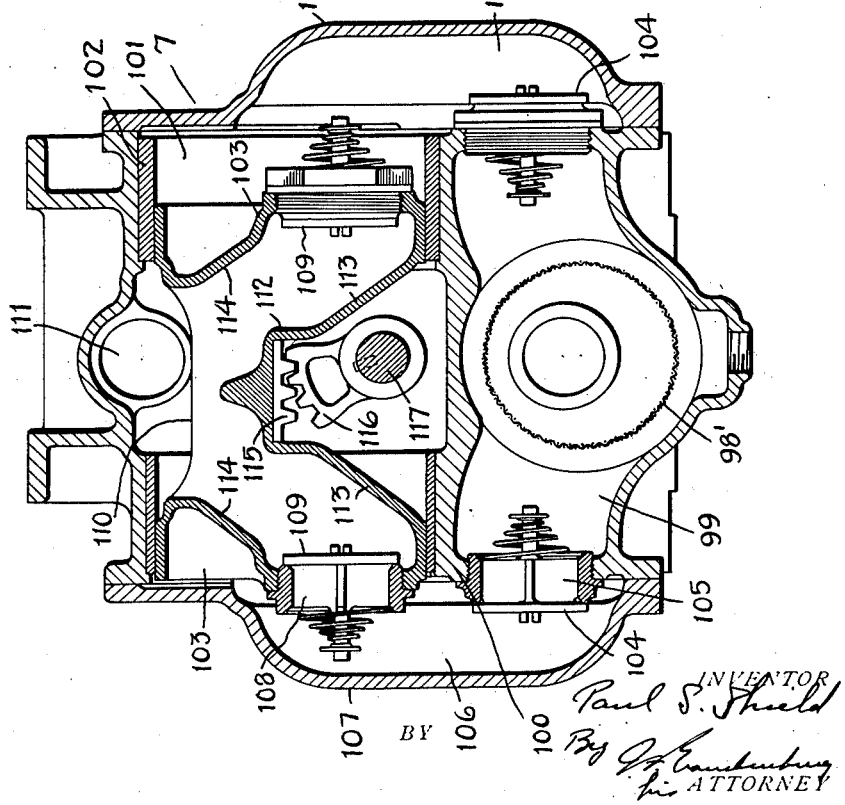
Fig. 8 is a longitudinal section through the pump.

The pump 7, which is illustrated in Figs. 8 and 9, has been specially designed for compactness and efficiency.

The pipe 6 from the underground tank delivers into a strainer 98' in a chamber 99 in the base of the pump casting 100. In the upper part of the pump casting a cylinder 101 is formed containing a lining 102. In this cylinder there operates a double acting hollow piston 103. Spring seated valves 104 command ports 105 at the ends of the chamber 99 opening into chambers 106 formed in detachable heads 107. The chambers 106 are open to the ends of the cylinder 101, and the ends of the piston 103 contain ports 108 which are commanded by spring-seated valves 109.

The top of the hollow piston is open at 110 and is always in communication with a port 111 in the top of the pump casting, from which extends the pipe 11.

The central part 112 of the hollow piston is elevated from the bottom, with sloping sides 113 toward either port 108, the top of the piston being correspondingly sloped from the tops of these ports upward and inward, at 114.

A very compact double-acting pump is thus provided, in which the resistance to the flow of the liquid is minimized.

The under side of the elevation 112 is provided with rack teeth 115, preferably formed on a separate piece, which are meshed by a gear segment 116 on a rock-shaft 117, which is oscillated either by hand or by the driving connection 10 from a motor, heretofore referred to.

The preferred form of the invention has been described in detail, but it will be evident that there may be numerous changes without departing from essentials.

I claim:

1. In a measuring dispenser including a meter and a master element for rendering the dispenser inoperative when a predetermined amount has been delivered, a predeterminer controlling said master element, an indicator, an operative connection between said predeterminer and said indicator enabling said predeterminer to be set by movement relative to said indicator, means for driving said predeterminer and said indicator by power other than that furnished by said meter, an escapement operated by said meter and controlling said predeterminer and said indicator, means for automatically restoring said indicator to normal position, and means for freeing said escapement and for disconnecting said indicator and said predeterminer from each other to permit each to be restored to its normal position.

2. In a measuring dispenser including a meter and a master element for rendering the dispenser inoperative when a predetermined amount has been delivered, a predeterminer controlling said master element, an indicator, an operative connection between said predeterminer and said indicator enabling said predeterminer to be set by movement relative to said indicator, means for driving said predeterminer and said indicator by power other than that furnished by said meter, an escapement operated by said meter and controlling said predeterminer and said indicator, means for automatically restoring said indicator to normal position, means for freeing said escapement and for disconnecting said indicator and said predeterminer from each other to permit each to be restored to its normal position, and a full-stroke device associated with the last-mentioned means.

3. In a measuring dispenser including a meter and a master element for rendering the dispenser inoperative when a predetermined amount has been delivered, a predeterminer controlling said master element, an indicator, an operative connection between said predeterminer and said indicator enabling said predeterminer to be set by movement relative to said indicator, a driving spring associated with said predeterminer, and a meter-operated escapement associated with said indicator and controlling both said indicator and said predeterminer, said escapement acting also as a detent to hold said indicator when said predeterminer is set.

4. In a measuring dispenser including a meter and a master element for rendering the dispenser inoperative when a predetermined amount has been delivered, a predeterminer controlling said master element, an indicator, an operative connection between said predeterminer and said indicator enabling said predeterminer to be set by movement relative to said indicator, a driving spring associated with said predeterminer, a meter-operated escapement associated with said indicator and controlling both said indicator and said predeterminer, said escapement acting also as a detent to hold said indicator when said predeterminer is set, means for automatically restoring said indicator to normal position, and means for freeing said escapement and for disconnecting said indicator and said predeterminer from each other to permit each to be restored to its normal position.

5. In a measuring dispenser including a meter and a master element for rendering the dispenser inoperative when a predetermined amount has been delivered, a predeterminer controlling said master element, an indicator, an operative connection between said predeterminer and said indicator enabling said predeterminer to be set by movement relative to said indicator, a helical spring for driving said predeterminer and said indicator, and a meter-operated escapement controlling said predeterminer and said indicator.

6. In a measuring dispenser including a meter and a master element for rendering the dispenser inoperative when a predetermined amount has been delivered, a predeterminer controlling said master element, an indicator, an operative connection between said predeterminer and said indicator enabling said predeterminer to be set by movement relative to said indicator, a helical spring for driving said predeterminer and said indicator, a rack and pinion connection between said spring and said predeterminer, and a meter-operated escapement controlling said predeterminer and said indicator.

7. In a measuring dispenser including a meter and a master element for rendering the dispenser inoperative when a predetermined amount has been delivered, a predeterminer controlling said master element, an indicator, an operative connection between said predeterminer and said indicator enabling said predeterminer to be set by movement relative to said indicator, a driving spring associated with said predeterminer, a meter-operated escapement associated with said indicator and controlling both said indicator and said predeterminer, said escapement acting also as a detent to hold said indicator when said predeterminer is set, and means for automatically restoring said indicator to initial position by either forward or backward movement, said escapement comprising a ratchet wheel having teeth the sloping sides of which are formed with shoulders, and an escapement dog formed to coact with the shoulders of said ratchet teeth.

8. In a measuring dispenser including a meter and a master element for rendering the dispenser inoperative when a predetermined amount has been delivered, a predeterminer controlling said master element, an indicator, an operative connection between said predeterminer and said indicator enabling said predeterminer to be set by movement relative to said indicator, means for driving said predeterminer and said indicator by power other than that furnished by said meter, an escapement operated by said meter and controlling said predeterminer and said indicator, means for automatically restoring said indicator to normal position by either forward or backward movement, said escapement comprising a ratchet wheel having teeth the sloping sides of which are formed with shoulders, and an escapement dog formed to coact with the shoulders of said ratchet teeth, and means for freeing said escapement and for disconnecting said indicator and said predeterminer from each other to permit each to be restored to its normal position.

9. In a measuring dispenser including a meter and a master element for rendering the dispenser inoperative when a predetermined amount has been delivered, a predeterminer controlling said master element, an indicator, an operative connection between said predeterminer and said indicator enabling said predeterminer to be set by movement relative to said indicator, means for driving said predeterminer and said indicator by power other than that furnished by said meter, an escapement operated by said meter and controlling said predeterminer and said indicator, means for automatically restoring said indicator to normal position by either forward or backward movement, and means for freeing said escapement and for disconnecting said indicator and said predeterminer from each other to permit each to be restored to its normal position.

10. In a mechanism of the character described, an indicator comprising a rotary part, a spring for restoring said part to a normal position by movement in either direction, and a connection between said spring and said part, which connection automatically shifts past dead center with reference to said part.

11. In a mechanism of the character described, a predeterminer comprising a rotary part having face projections thereon, and a setting lever adapted to act positively on said projections when said lever is moved in one direction and to latch past said projections on return movement of said lever.

12. In a measuring dispenser including a meter and a master element for rendering the dispenser inoperative when a predetermined amount has been delivered, a predeterminer controlling said master element, means for setting said predeterminer, a driving spring associated with said predeterminer, a gear connected with said predeterminer, a second gear meshing the aforementioned gear, an indicator having a shaft coaxial with said second gear, said second gear and said shaft being unfastened to each other, two ratchet wheels fixed to said shaft, meter operated escapement means coacting with one of said ratchet wheels, a pawl on said second gear coacting with the other of said ratchet wheels, a spring for restoring said indicator to normal position, and means for freeing said escapement means and said pawl from said ratchet wheels to permit said predeterminer and said indicator each to be restored to normal position.

13. In a measuring dispenser including a meter and a master element for rendering the dispenser inoperative when a predetermined amount has been delivered, a predeterminer controlling said master element, means for setting said predeterminer, a driving spring associated with said predeterminer, a gear connected with said predeterminer, a second gear meshing the aforementioned gear, an indicator having a shaft coaxial with said second gear, said second gear and said shaft being unfastened to each other, a meter operated escapement controlling said shaft, a one-way acting connection between said second gear wheel and said shaft, a spring for restoring said indicator to normal position, and means for freeing said escapement and said one-way acting connection to permit said predeterminer and said indicator each to be restored to normal position.

14. In a measuring dispenser including a meter and a master element for rendering the dispenser inoperative when a predetermined amount has been delivered, a predeterminer controlling said master element, means for setting said predeterminer, a driving spring associated with said predeterminer, a gear connected with said predeterminer, a second gear meshing the aforementioned gear, an indicator having a shaft coaxial with said second gear, said second gear and said shaft being unfastened to each other, a meter operated escapement controlling said shaft, a one-way acting connection between said second gear wheel and said shaft, a spring for restoring said indicator to normal position, a clearing member adapted to act on said escapement and said one-way acting connection, and a setting lever adapted to set said predeterminer by movement of said lever in one direction and to act on said clearing member by movement in a different direction.

15. In a mechanism of the character described, a predeterminer, an indicator, a one-way acting connection between said predeterminer and said indicator, driving means associated with said predeterminer, an escapement associated with said indicator, means for restoring said indicator to normal position, and clearing means adapted to act on said escapement and said one-way acting connection.

16. In a mechanism of the character described, a predeterminer, an indicator, a one-way acting connection between said predeterminer and said indicator, driving means associated with said predeterminer, an escapement associated with said indicator, means for restoring said indicator to normal position, clearing means adapted to act on said escapement and said one-way acting connection, and a setting lever for setting said predeterminer by movement in one direction, movement of said setting lever in another direction actuating said clearing means.

17. In a mechanism of the character described, a predeterminer, an indicator, a one-way acting connection between said predeterminer and said indicator, driving means associated with said predeterminer, an escapement associated with said indicator, means for restoring said indicator to normal position, clearing means adapted to act on said escapement and said one-way acting connection, a setting lever for setting said predeterminer by movement in one direction, a spring for holding said setting lever in a normal position, yielding means against which said lever is thus held, movement of said lever in the contrary direction from its normal position actuating said clearing means.

18. In a mechanism of the character described, a predeterminer, an indicator, a one-way acting connection between said predeterminer and said indicator, driving means associated with said predeterminer, an escapement associated with said indicator, means for restoring said indicator to normal position, a clearing lever pivoted coaxially with said predeterminer and adapted to act on said escapement and said one-way acting connection, and a setting lever adapted to set said predeterminer by movement in one direction from normal position of said setting lever and to act on said clearing lever by movement in the other direction from normal position.

19. In a measuring dispenser, the combination with a meter and a master element for rendering the dispenser inoperative when a predetermined amount has been delivered, of a rotatable predeterminer disc adapted to be set by movement in one direction, means whereby said predeterminer disc is turned in the opposite direction with the operation of the meter, said disc having a notch, a part connected with said master element adapted to engage with said notch, and a bridge piece pivoted to said disc and adapted to prevent said part going into said notch if the predeterminer disc is turned a full revolution in the setting direction.

PAUL S. SHIELD.